(12) United States Patent
Iida

(10) Patent No.: US 12,370,946 B2
(45) Date of Patent: Jul. 29, 2025

(54) NOTIFICATION DEVICE

(71) Applicant: TOYOTA JIDOSHA KABUSHIKI KAISHA, Toyota (JP)

(72) Inventor: Taiki Iida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 18/463,626

(22) Filed: Sep. 8, 2023

(65) Prior Publication Data

US 2024/0174173 A1 May 30, 2024

(30) Foreign Application Priority Data

Nov. 24, 2022 (JP) ................... 2022-187556

(51) Int. Cl.
*B60Q 9/00* (2006.01)
*G06V 20/58* (2022.01)

(52) U.S. Cl.
CPC ............. *B60Q 9/008* (2013.01); *G06V 20/58* (2022.01)

(58) Field of Classification Search
None
See application file for complete search history.

(56) References Cited

U.S. PATENT DOCUMENTS

| | | | |
|---|---|---|---|
| 9,953,535 B1 * | 4/2018 | Canavor | G05D 1/0212 |
| 10,427,689 B2 | 10/2019 | Tokimasa et al. | |
| 10,486,698 B2 | 11/2019 | Masui et al. | |
| 10,731,996 B2 | 8/2020 | Naito | |
| 10,922,561 B2 | 2/2021 | Ozawa et al. | |
| 11,017,247 B2 | 5/2021 | Hayashi et al. | |
| 11,072,328 B2 | 7/2021 | Masui et al. | |
| 11,235,766 B2 | 2/2022 | Masui et al. | |
| 11,247,671 B2 | 2/2022 | Komori | |
| 11,763,681 B2 * | 9/2023 | Fassbender | B60Q 1/525 340/436 |
| 2008/0243337 A1 * | 10/2008 | Tsuda | B60W 50/14 701/41 |
| 2014/0358414 A1 * | 12/2014 | Ibrahim | G01C 21/10 701/119 |
| 2015/0183430 A1 * | 7/2015 | Schwindt | B60W 30/12 701/23 |
| 2016/0318511 A1 * | 11/2016 | Rangwala | B60Q 1/525 |

(Continued)

FOREIGN PATENT DOCUMENTS

| | | |
|---|---|---|
| JP | 2004-118609 A | 4/2004 |
| JP | 2022-030835 A | 2/2022 |

*Primary Examiner* — Muhammad Adnan
(74) *Attorney, Agent, or Firm* — SoraIP, Inc.

(57) ABSTRACT

The notification device includes an abnormality recognition unit that recognizes an abnormality existing on a road shoulder of an oncoming lane or an oncoming lane based on a detection result of an external sensor provided in the vehicle, an external notification unit that is provided in the vehicle and outputs at least one of sound and light toward the outside of the vehicle, and a notification control unit that performs notification by the external notification unit to an oncoming vehicle traveling on the oncoming lane so as to approach the vehicle in front of the vehicle. The notification control unit determines a notification time according to at least one of an estimated vehicle speed of the oncoming vehicle and a risk degree set in advance according to the type of abnormality.

2 Claims, 3 Drawing Sheets

(56) References Cited

U.S. PATENT DOCUMENTS

| | | | |
|---|---|---|---|
| 2017/0011625 A1* | 1/2017 | Stelzig | G08G 1/0141 |
| 2019/0311613 A1* | 10/2019 | Johnson | G08G 1/0112 |
| 2020/0307566 A1* | 10/2020 | Ghose | G05D 1/81 |
| 2020/0326191 A1 | 10/2020 | Naito | |
| 2021/0364631 A1 | 11/2021 | Hasegawa et al. | |
| 2022/0105984 A1* | 4/2022 | Kojo | B60W 30/12 |
| 2022/0309924 A1* | 9/2022 | Mimura | B60Q 5/006 |
| 2023/0211721 A1* | 7/2023 | Maurer | B60Q 1/143 |
| | | | 315/82 |
| 2023/0399027 A1* | 12/2023 | Schmidt | G01S 13/931 |
| 2024/0112149 A1* | 4/2024 | Komori | G06T 7/00 |

\* cited by examiner

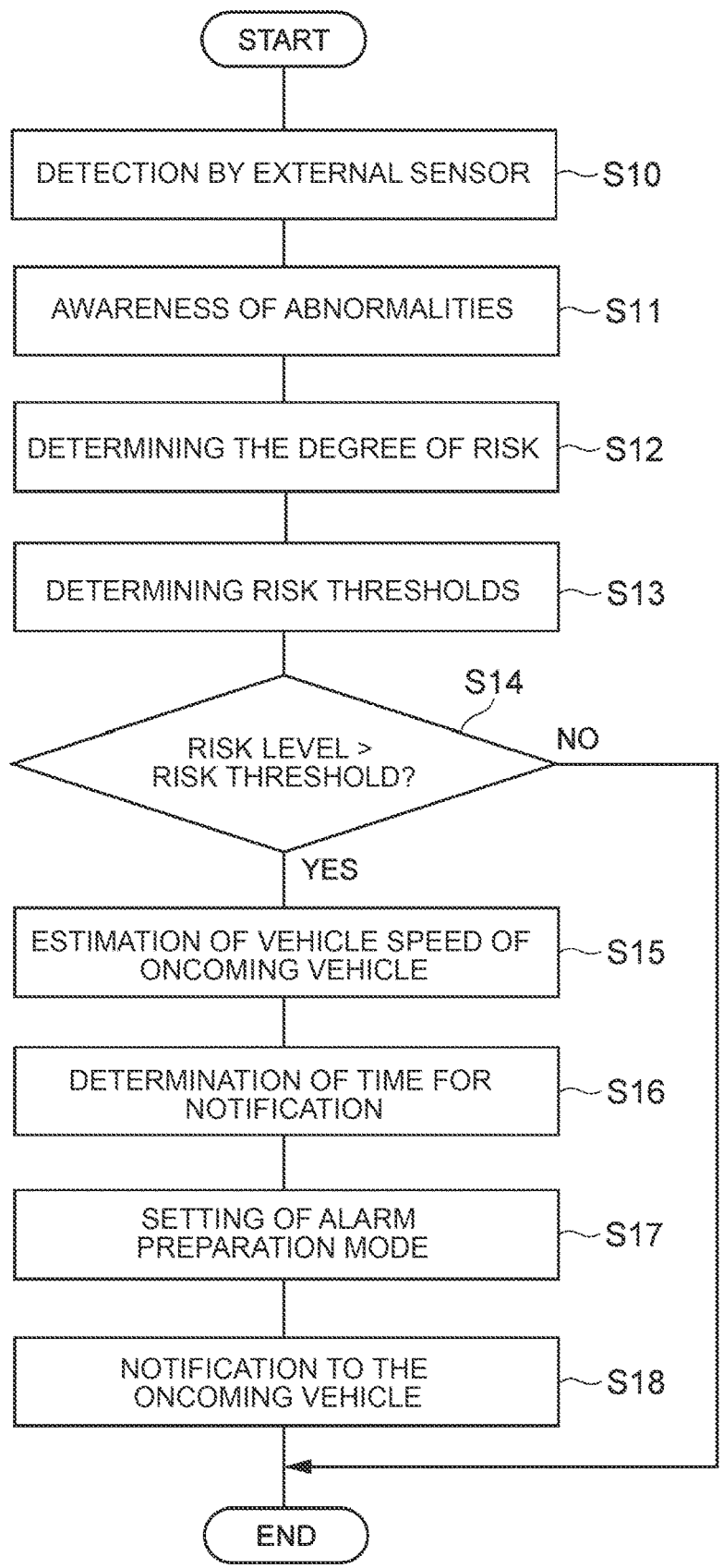

NOTIFICATION DEVICE

CROSS-REFERENCE TO RELATED APPLICATION

This application claims priority to Japanese Patent Application No. 2022-187556 filed on Nov. 24, 2022, incorporated herein by reference in its entirety.

BACKGROUND

1. Technical Field

The present disclosure relates to a notification device.

2. Description of Related Art

Conventionally, there is known a failed vehicle notification device that notifies, by vehicle-to-vehicle communication, information about a failed vehicle to an oncoming vehicle traveling toward the failed vehicle in an oncoming lane, when information about the failed vehicle stopping on the oncoming lane is received from the failed vehicle by vehicle-to-vehicle communication (for example, Japanese Unexamined Patent Application Publication No. 2022-030835 (JP 2022-030835 A)).

SUMMARY

The above-described related art is based on the premise that the oncoming vehicle is configured to be capable of performing the vehicle-to-vehicle communication. For an oncoming vehicle that cannot perform the vehicle-to-vehicle communication, it is conceivable to output at least one of sound and light to notify an abnormality existing in the oncoming lane or on a road shoulder of the oncoming lane. When such notification is performed automatically, information that can be used is limited more than by the vehicle-to-vehicle communication, and therefore there is room for improvement in appropriately performing the notification to the oncoming vehicle in accordance with the situation.

A notification device according to an aspect of the present disclosure includes: an abnormality recognition unit that recognizes an abnormality that exists in an oncoming lane or on a road shoulder of the oncoming lane, based on a detection result of an external sensor provided in a vehicle; an external notification unit that is provided in the vehicle and that outputs at least one of sound and light toward an outside of the vehicle; and a notification control unit that performs notification by the external notification unit to an oncoming vehicle traveling in front of the vehicle in the oncoming lane so as to approach the vehicle. The notification control unit determines a time of the notification in accordance with at least one of an estimated vehicle speed of the oncoming vehicle and a degree of risk set in advance depending on a category of the abnormality.

With the notification device according to the aspect of the present disclosure, since the time of the notification is determined in accordance with at least one of the estimated vehicle speed and the degree of risk, the presence of an abnormality is more easily notified to an oncoming vehicle far away by, for example, increasing the time of the notification when the estimated vehicle speed of the oncoming vehicle is high. In this way, the notification to the oncoming vehicle can be appropriately performed in accordance with the situation.

In one embodiment, the notification control unit may determine the time of the notification in accordance with a vehicle speed of the vehicle as the estimated vehicle speed of the oncoming vehicle. In this case, it is possible to easily estimate the vehicle speed of the oncoming vehicle by using the fact that the vehicle speed of the vehicle and the vehicle speed of the oncoming vehicle usually tend not to differ significantly from each other in an own lane and the oncoming lane.

In one embodiment, the notification control unit may determine a notification preparation period that is duration of a notification preparation mode, as the time of the notification, and when the oncoming vehicle is recognized during the notification preparation mode, the notification may be performed by the external notification unit. In this case, notification depending on the situation can be appropriately performed to the recognized oncoming vehicle, and the notification until the oncoming vehicle is recognized can be omitted.

With the notification device according to the aspect of the present disclosure, the notification to the oncoming vehicle can be appropriately performed in accordance with the situation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating an example of the oncoming vehicle notification processing.

DETAILED DESCRIPTION OF EMBODIMENTS

Hereinafter, embodiments of the present disclosure will be described with reference to the drawings.

Figure 1:
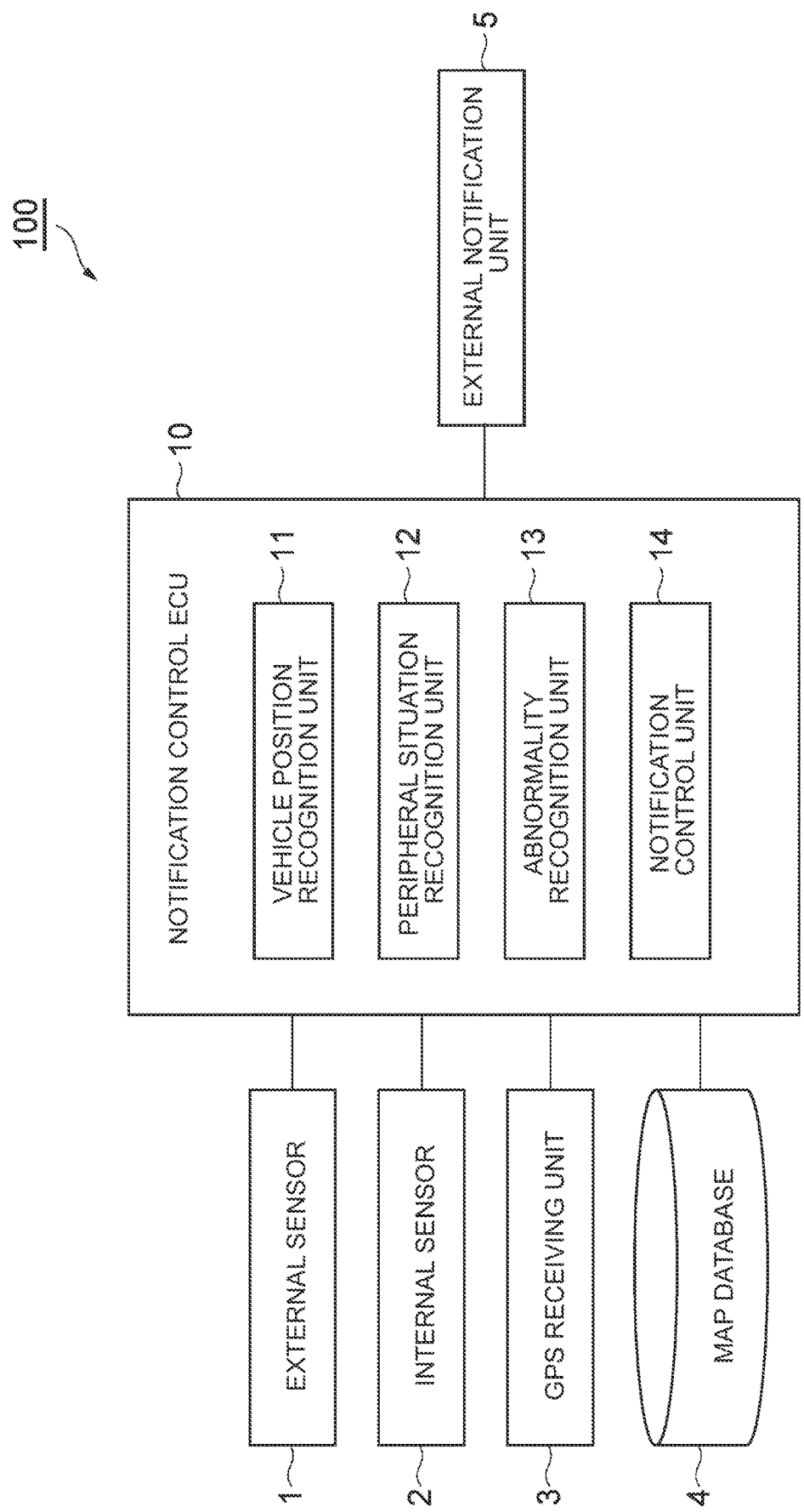
FIG. 1 is a block diagram illustrating a notification device according to an embodiment.

FIG. 1 is a block diagram illustrating a notification device according to an embodiment. The notification device 100 illustrated in FIG. 1 is a device that is mounted on a vehicle such as a passenger car and notifies the oncoming vehicle of an abnormality existing on a road shoulder of an oncoming lane or an oncoming lane. The oncoming lane is a lane whose traveling direction is opposite to the own lane on which the vehicle is traveling, and includes a lane adjacent to the own lane. The oncoming lane may not necessarily be adjacent to the own lane. It is assumed that, for example, no implant or fence or the like is provided between the own lane and the opposite lane, but a pole or the like may be provided.

The vehicle may be capable of performing automated driving. The autonomous driving is a vehicle control in which a vehicle is automatically driven toward a preset destination. The destination may be set by an occupant such as a driver, or may be automatically set by the vehicle. In automatic driving, the driver does not need to perform a driving operation, and the vehicle travels automatically. The notification device 100 may automatically notify the oncoming vehicle during automatic driving of the vehicle. Configuration of notification device As illustrated in FIG. 1, the notification device 100 includes a notification control ECU 10. The notification control ECU 10 is an electronic control unit including Central Processing Unit (CPU), Read Only memory (ROM), Random Access memory (RAM), Controller Area Network (CAN) communication circuitry, and the like. In the notification control ECU 10, for example, various functions are realized by loading a program stored in a ROM into a RAM and executing the program loaded in RAM by a CPU. The notification control ECU 10 may include a plurality of electronic units.

The notification control ECU 10 is connected to the external sensor 1, the internal sensor 2, GPS receiving unit 3, the map database 4, and the external notification unit 5.

The external sensor 1 is a detection device that detects a situation around the vehicle. The external sensor 1 includes at least one of a camera and a radar sensor. The camera is an imaging device that captures an image of a situation around the vehicle. The camera is provided on the rear side of the windshield of the vehicle as an example. The camera acquires imaging information related to a situation around the vehicle. The camera may be a monocular camera or a stereo camera. The stereo camera has two imaging units arranged to reproduce binocular parallax. The imaging information of the stereo camera also includes information in the depth direction.

The radar sensor is a detection device that detects an object around the vehicle using radio waves (for example, millimeter waves) or light. The radar sensor includes, for example, a millimeter-wave radar or a lidar Laser Imaging Detection and Ranging (LiDAR). The radar sensor transmits radio waves or light to the surroundings of the vehicle, and detects the object by receiving the radio waves or light reflected by the object.

The internal sensor 2 is a detection device that detects a traveling state of the vehicle. The internal sensor 2 includes a vehicle speed sensor. The vehicle speed sensor is a detector that detects the speed of the vehicle. As the vehicle speed sensor, for example, a wheel speed sensor that detects a rotation speed of a drive shaft that rotates integrally with a wheel or a wheel of a vehicle is used. The internal sensor 2 may include an acceleration sensor and a yaw rate sensor.

GPS receiving unit 3 measures the position (e.g., latitude and longitude) of the vehicle V1 by receiving signals from three or more GPS satellites. GPS receiving unit 3 transmits the measured position data of the vehicle V1 to the notification control ECU 10.

The map database 4 is a database that stores map information. The map database 4 is formed, for example, in a Hard Disk Drive (HDD) mounted on vehicles. The map database 4 may be provided in a management center or the like capable of communicating with the host vehicle. The map information includes location information of a road, information of a road shape (for example, a curve, a type of a straight portion, a curvature of a curve, and the like), location information of an intersection and a branch point, and location information of a structure. The map information may also include road type information (for example, a road in a residential area, an automobile-dedicated road, and other general roads). The general road is a road other than an automobile exclusive road, and is, for example, a road connecting between a residential area and a residential area.

The external notification unit 5 is provided in the vehicle, and outputs at least one of sound and light toward the outside of the vehicle. The external notification unit 5 includes, for example, a sound output unit that outputs sound to the outside of the vehicle, and an optical output unit that outputs light to the outside of the vehicle. As the sound output device of the external notification unit 5, for example, a horn provided at a front portion of the vehicle can be used. The sound output device of the external notification unit 5 may also be a sound output device such as an external speaker separately provided for notification to the oncoming vehicle.

As the light output device of the external notification unit 5, for example, a light device provided at a front portion of the vehicle can be used. The type of the lamp is not particularly limited, but a headlamp using, for example, a Light Emitting Diode (LED) can be used. The light outputter of the external notification unit 5 may be constituted by, for example, a plurality of LED, and may be controlled so that the light is directed toward the oncoming vehicle from the front of the vehicle. The optical output device of the external notification unit 5 may be an optical output device such as an external display separately provided for notification to the oncoming vehicle.

Next, the functional configuration of the notification control ECU 10 will be described. As illustrated in FIG. 1, the notification control ECU 10 includes a vehicle position recognition unit 11, a peripheral situation recognition unit 12, an abnormality recognition unit 13, and a notification control unit 14.

The vehicle position recognition unit 11 recognizes the position of the vehicle on the map based on the position information of GPS receiving unit 3 and the map information of the map database 4. In addition, the vehicle position recognition unit 11 may recognize the position of the vehicle by a Simultaneous Localization and Mapping (SLAM) technique using the position information of a fixed obstacle such as a utility pole included in the map information of the map database 4 and the detection result of the external sensor 1. In addition, the vehicle position recognition unit 11 may recognize the position of the vehicle on the map by a well-known method.

The peripheral situation recognition unit 12 recognizes the surrounding situation of the vehicle based on the detection result of the external sensor 1. The situation around the vehicle includes an oncoming vehicle traveling in an oncoming lane so as to approach the vehicle in front of the vehicle. The peripheral situation recognition unit 12 may recognize the relative speed and the relative position of the oncoming vehicle traveling in the oncoming lane so as to approach the vehicle in front of the vehicle based on the detection result of the external sensor 1.

Figure 2:
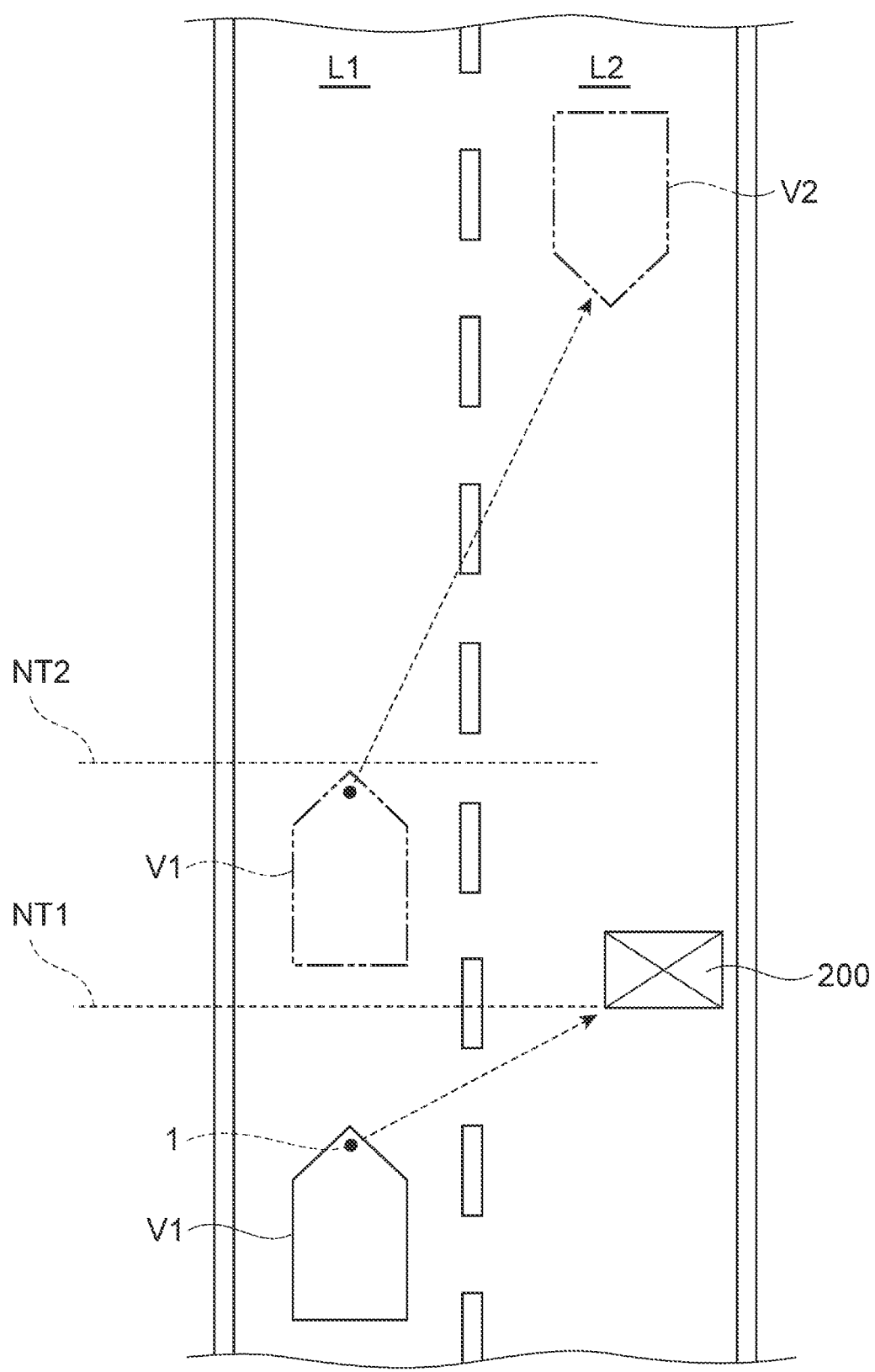
FIG. 2 is a plan view for explaining notification to an oncoming vehicle by the notification device.

The abnormality recognition unit 13 recognizes an abnormality existing on a road shoulder of an oncoming lane or an oncoming lane based on a detection result of the external sensor 1. The abnormality in this case is a plan view for explaining the notification of the oncoming vehicle traveling in the oncoming lane. FIG. 2 illustrates an own lane L1 on which the vehicle V1 is traveling, and an oncoming lane L2 which is a lane opposite to the own lane L1 and adjoins the own lane L1. In the oncoming lane L2, the oncoming vehicle V2 travels to approach the vehicle V1 in front of the vehicle V1. As shown in FIG. 2, the external sensor 1 of the vehicle V1 detects an abnormality 200 existing in the oncoming lane L2 as a condition around the vehicle V1.

Examples of the object or the situation corresponding to the abnormality 200 include a falling object, a person, a failed vehicle, a road construction, a road irregularity such as a depression, and a reverse-running vehicle that reversely travels in an oncoming lane. A person corresponding to the abnormality 200 includes a person seated in a shoulder of an oncoming lane or an oncoming lane, and a person lying on a shoulder of an oncoming lane or an oncoming lane. The failed vehicle may include a falling two-wheeled vehicle. The reverse traveling vehicle means a vehicle that travels in the same direction as the host vehicle in the oncoming lane. For example, the abnormality recognition unit 13 recognizes the abnormality 200 by analyzing the detected object or situation and a previously stored object or situation corresponding to the abnormality 200 by pattern matching or the like. The abnormality recognition unit 13 may recognize the position of the abnormality in the oncoming lane. The abnormality recognition unit 13 may recognize the position of the abnormality 200 relative to the vehicle V1 as the position of the abnormality in the oncoming lane, and may also recognize the position of the abnormality 200 on the map.

The abnormality recognition unit 13 may determine the risk degree of the recognized abnormality according to, for example, the size or type of the recognized object or the degree of the recognized situation. The risk degree is an index (risk rank) used for determining whether or not to notify the oncoming vehicle of the recognized abnormality. For example, the degree of risk is stored in advance in the notification control ECU 10 as a value representing a magnitude of an effect that an abnormality existing on a road shoulder of an oncoming lane or an oncoming lane hinders the progress of the oncoming vehicle. The risk degree may be set to a larger value as the size of the recognized object is larger, for example. The risk degree may be, for example, a maximum value that can be taken when the recognized situation corresponds to a multiple accident or the like.

The abnormality recognition unit 13 may determine the risk threshold value according to the type of the road based on the position of the abnormality on the map and the map information. The risk threshold value is a threshold value of a risk degree for determining whether or not the recognized object or situation is an abnormality to be notified to the oncoming vehicle. As an example, in a road in a residential area, there is a tendency that there is a relatively high possibility that an object is present on a road, and in a road dedicated to an automobile, there is a tendency that there is a relatively low possibility that an object is present on a road, and in a general road, it can be considered that there is a possibility that an object is present on a road intermediate between a road in the residential area and an automobile dedicated road. Therefore, the abnormality recognition unit 13 may determine the risk threshold value in a case where the recognized object or situation exists on the automobile dedicated road to be smaller than the risk threshold value in a case where the recognized object or situation exists on the general road. The abnormality recognition unit 13 may determine the risk threshold value in a case where the recognized object or situation exists on the general road to be smaller than the risk threshold value in a case where the recognized object or situation exists on the road in the residential area.

The notification control unit 14 performs notification by the external notification unit 5 to the oncoming vehicle traveling on the oncoming lane so as to approach the vehicle in front of the vehicle. For example, the notification control unit 14 determines whether or not the degree of risk is greater than the risk threshold, and when determining that the degree of risk is greater than the risk threshold, notifies the oncoming vehicle by the external notification unit 5.

The notification control unit 14 estimates the vehicle speed (estimated vehicle speed) of the oncoming vehicle. The notification control unit 14 uses the vehicle speed of the vehicle detected by the internal sensor 2 as the estimated vehicle speed of the oncoming vehicle, for example, by using that there is a tendency that the vehicle speed of the vehicle and the vehicle speed of the oncoming vehicle do not normally differ significantly.

The notification control unit 14 determines, for example, a notification preparation period (notification time) according to at least one of the estimated vehicle speed and the risk degree of the oncoming vehicle. The notification preparation period means the duration of the notification preparation mode in which the external notification unit 5 is ready to output at least one of sound and light toward the outside of the vehicle. In the notification preparation mode, the external notification unit 5 only needs to be ready to output sound and light, and does not necessarily have to output sound and light at all times. The notification preparation period and the notification preparation mode may be determined for each recognized abnormality.

For example, the notification control unit 14 determines the notification preparation period as a longer time as the estimated vehicle speed of the oncoming vehicle is higher. Therefore, the higher the estimated vehicle speed of the oncoming vehicle is, the longer the distance calculated by the product of the estimated vehicle speed and the notification preparation period becomes. This distance corresponds to the distance from the abnormality to the oncoming vehicle along the oncoming lane where the oncoming vehicle has an opportunity to be notified. The higher the estimated vehicle speed of the oncoming vehicle, the earlier the distance from the abnormality along the oncoming lane can be notified to the oncoming vehicle farther away. Further, the distance is shortened according to the estimated vehicle speed if the estimated vehicle speed of the oncoming vehicle is low even if the distance from the abnormality along the oncoming lane is a distant oncoming vehicle. Therefore, it is possible to prevent the remote oncoming vehicle from being notified too soon. Note that the notification control unit 14 may determine the notification preparation period as a longer time as the degree of risk increases.

For example, the notification control unit 14 sets the notification preparation mode when the position of the object recognized as the abnormality 200 and the vehicle V1 are aligned (see the broken line NT1 in FIG. 2), and releases the notification preparation mode after the notification preparation period elapses after the setting. The notification control unit 14 may control the external notification unit 5 to output at least one of sound and light toward the outside of the vehicle when the oncoming vehicle V2 traveling in the oncoming lane L2 is recognized so as to approach the vehicle V1 in front of the vehicle V1 during the notification preparation mode (see the broken line NT2 in FIG. 2). Accordingly, the oncoming vehicle V2 is notified of the abnormality 200 existing in the oncoming lane L2. The notification control unit 14 may control the external notification unit 5 to stop at least one of the outputted sound and the outputted light when passing through the oncoming vehicle V2.

The output of the sound toward the outside of the vehicle may be a horn warning sound. The warning sound of the horn may be output continuously or may be output intermittently. The output of the light toward the outside of the vehicle may be a high beam state of the headlamp with respect to the light toward the oncoming vehicle. The high beam state of the headlamp may be continuous irradiation or intermittent irradiation.

When recognizing a plurality of consecutive oncoming vehicles during the notification preparation mode, the notification control unit 14 may control the external notification unit 5 to output at least one of sound and light toward the outside of the vehicle continuously until the oncoming vehicle is interrupted. The notification control unit 14 may extend the notification preparation period when the oncoming vehicle is not recognized until the notification preparation period ends during the notification preparation mode.

For example, in a case where the recognized abnormality is a reverse-running vehicle in the oncoming lane, the notification control unit 14 may notify the oncoming vehicle of an abnormality existing in the oncoming lane by outputting light toward the outside of the vehicle from before the reverse-running vehicle and the vehicle are arranged side by side. As a result, it is possible to promptly notify the remote oncoming vehicle as compared with the case where the sound is output.

The notification control unit 14 may notify the oncoming vehicle of an abnormality existing in the oncoming lane by outputting a sound toward the outside of the vehicle in a longer time than when the vehicle speed of the vehicle is faster than the reverse traveling vehicle, for example, when the recognized abnormality is a reverse traveling vehicle of the oncoming lane, when the vehicle speed of the vehicle is slower than the reverse traveling vehicle. This makes it easier for sound to reach the oncoming vehicle.

Operation of the Notification Device

Next, the operation of the notification device 100 will be described with reference to the drawings. FIG. 3 is a flowchart illustrating an example of the oncoming vehicle notification processing. The oncoming vehicle notification processing is executed, for example, when the vehicle is traveling in the own lane where the oncoming lane exists.

As illustrated in FIG. 3, the notification control ECU 10 of the notification device 100 performs, as an S10, the detection by the external sensor 1 by the peripheral situation recognition unit 12. When the external sensor 1 detects an oncoming vehicle traveling in the oncoming lane so as to approach the vehicle in front of the vehicle, the peripheral situation recognition unit 12 recognizes the relative speed and the relative position of the oncoming vehicle.

The notification control ECU 10 uses the abnormality recognition unit 13 to recognize an abnormality as a S11. The abnormality recognition unit 13 recognizes the abnormality, for example, when the external sensor 1 detects an abnormality existing on the shoulder of the oncoming lane or the oncoming lane. The abnormality recognition unit 13 may recognize the position of the abnormality on the map.

The notification control ECU 10 determines the degree of risk by the abnormality recognition unit 13 as a S12. The abnormality recognition unit 13 determines the risk level of the recognized abnormality according to, for example, the size or type of the recognized object or the degree of the recognized situation.

The notification control ECU 10 determines risk thresholds by the abnormality recognition unit 13 as S13. The abnormality recognition unit 13 determines a risk threshold value based on, for example, the position of the abnormality on the map and the map information, for example, according to the type of the traveling road.

In S14, the notification control ECU 10 determines whether the degree of risk is greater than the risk thresholds by the notification control unit 14. When the notification control unit 14 determines that the risk level is greater than the risk threshold (S14: YES), the notification control ECU 10 proceeds to S15. When the notification control unit 14 determines that the risk level is equal to or less than the risk threshold (S14: NO), the notification control ECU 10 ends the process of FIG. 3. After that, the notification control ECU 10 repeats the process from S10 after a predetermined period of time elapses.

The notification control ECU 10 estimates the vehicle speed of the oncoming vehicle by the notification control unit 14 as an S15. The notification control unit 14 uses, for example, the vehicle speed of the vehicle as the estimated vehicle speed of the oncoming vehicle.

The notification control ECU 10 determines a notification duration by the notification control unit 14 as a S16. The notification control unit 14 determines a notification preparation period according to at least one of the estimated vehicle speed and the risk degree of the oncoming vehicle.

The notification control ECU 10 sets the notification preparation mode by the notification control unit 14 as a S17. For example, the notification control unit 14 sets the notification preparation mode when the position of the object recognized as the abnormality and the vehicle are aligned.

The notification control ECU 10 performs notification to the oncoming vehicle by the notification control unit 14 as a S18. For example, when the notification control unit 14 recognizes the oncoming vehicle traveling on the oncoming lane so as to approach the vehicle in front of the vehicle during the notification preparation mode, it outputs at least one of the sound and the light toward the outside of the vehicle to notify the oncoming vehicle of an abnormality existing on the road shoulder of the oncoming lane or the oncoming lane. Thereafter, the notification control ECU 10 ends the present process of FIG. 3, and repeats the process from S10 after a predetermined period of time has elapsed.

According to the notification device 100 described above, the notification period is determined according to at least one of the estimated vehicle speed and the risk degree of the oncoming vehicle V2. Therefore, for example, when the estimated vehicle speed of the oncoming vehicle V2 is higher, the notification is made longer, so that it is easy to notify the distant oncoming vehicle V2 of the presence of an abnormality. In this way, the notification to the oncoming vehicle V2 can be appropriately performed according to the situation.

In the notification device 100, the notification control unit 14 determines the notification duration according to the vehicle speed of the vehicle V1 as the estimated vehicle speed of the oncoming vehicle V2. This makes it possible to easily estimate the vehicle speed of the oncoming vehicle V2 by using the fact that the vehicle speed of the vehicle V1 and the vehicle speed of the oncoming vehicle V2 tend not to differ significantly from each other in the own lane L1 and the oncoming lane L2.

In the notification device 100, the notification control unit 14 determines a notification preparation period, which is the duration of the notification preparation mode, as the notification time, and performs notification by the external notification unit 5 when the oncoming vehicle V2 is recognized during the notification preparation mode. This makes it possible to appropriately notify the recognized oncoming vehicle V2 according to the situation, and omit the notification until the oncoming vehicle V2 is recognized.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

For example, the notification control unit 14 determines the notification time according to the vehicle speed of the vehicle as the estimated vehicle speed of the oncoming vehicle, but is not limited to this example. The notification control unit 14 may calculate the estimated vehicle speed of the oncoming vehicle on the basis of the relative speed of the oncoming vehicle with respect to the vehicle recognized by the peripheral situation recognition unit 12 and the vehicle speed of the vehicle detected by the internal sensor 2. The notification control unit 14 may recognize the speed limit of the own lane or the oncoming lane on the basis of the recognized position of the vehicle on the map and the map information, and use the speed limit as the estimated vehicle speed of the oncoming vehicle. The notification control unit 14 may calculate the average vehicle speed of the vehicle speeds of the plurality of oncoming vehicles traveling in the oncoming lane based on the detection result of the external sensor 1, and use the average vehicle speed as the estimated vehicle speed of the oncoming vehicle. In this case, the notification control unit 14 may calculate the estimated vehicle speed of the oncoming vehicle by using not only the average vehicle speed but also the vehicle speed of the vehicle detected by the internal sensor 2.

The notification preparation period and the notification preparation mode are not essential. The notification control unit 14 may directly determine the notification time as the time for outputting at least one of the sound and the light toward the outside of the vehicle in accordance with at least one of the estimated vehicle speed and the risk degree of the oncoming vehicle V2.

The notification control unit 14 controls the external notification unit 5 to output at least one of the sound and the light toward the outside of the vehicle when recognizing the oncoming vehicle traveling in the oncoming lane so as to approach the vehicle in front of the vehicle during the notification preparation mode, but is not limited to this example. The notification control unit 14 may control the external notification unit 5 to output at least one of the sound and the light toward the outside of the vehicle even when the oncoming vehicle is not recognized during the notification preparation mode.

The abnormality recognition unit 13 recognizes an abnormality existing on the shoulder of the oncoming lane or the oncoming lane in front of the vehicle on the basis of the detection result of the external sensor 1, but may recognize an abnormality existing on the shoulder of the oncoming lane or the oncoming lane on the side or the rear of the vehicle (for example, a reverse traveling vehicle traveling backward on the oncoming lane on the side or the rear of the vehicle).

The notification device 100 may perform notification according to the position on the map of the vehicle. For example, the notification device 100 may perform the oncoming vehicle notification processing on the general road without performing the oncoming vehicle notification processing on the automobile dedicated road based on the position of the vehicle on the map and the map information.

The notification device 100 may automatically issue a predetermined emergency notification separately from the oncoming vehicle notification processing when the recognized abnormality is sufficiently highly likely to hinder the progress of the oncoming vehicle traveling in the oncoming lane, for example, a seated person, a lying person, or a large falling object.

What is claimed is:

1. A notification device comprising:
a processor configured to recognize an abnormality that exists in an oncoming lane or on a road shoulder of the oncoming lane, based on a detection result of an external sensor provided in a vehicle; and
an output device that is provided in the vehicle and configured to output at least one of sound and light toward an outside of the vehicle, wherein
the processor is configured to
control the output device to perform notification to an oncoming vehicle traveling in front of the vehicle in the oncoming lane so as to approach the vehicle,
determine a time of the notification in accordance with at least one of an estimated vehicle speed of the oncoming vehicle and a degree of risk set in advance depending on a category of the abnormality, and
determine the time of the notification in accordance with a vehicle speed of the vehicle as the estimated vehicle speed of the oncoming vehicle.

2. A notification device comprising:
a processor configured to recognize an abnormality that exists in an oncoming lane or on a road shoulder of the oncoming lane, based on a detection result of an external sensor provided in a vehicle; and
an output device that is provided in the vehicle and configured to output at least one of sound and light toward an outside of the vehicle, wherein
the processor is configured to
control the output device to perform notification to an oncoming vehicle traveling in front of the vehicle in the oncoming lane so as to approach the vehicle,
determine a time of the notification in accordance with at least one of an estimated vehicle speed of the oncoming vehicle and a degree of risk set in advance depending on a category of the abnormality, and
determine a notification preparation period that is duration of a notification preparation mode, as the time of the notification, and
the output device is configured to perform the notification when the oncoming vehicle is recognized during the notification preparation mode.

* * * * *